United States Patent
Lin

(12) United States Patent (10) Patent No.: US 8,256,983 B2
Lin (45) Date of Patent: Sep. 4, 2012

(54) QUICK RELEASE DEVICE FOR BICYCLE

(76) Inventor: Chang Hui Lin, ChangHua Hsien (TW)

( * ) Notice: Subject to any disclaimer, the term of this patent is extended or adjusted under 35 U.S.C. 154(b) by 0 days.

(21) Appl. No.: 13/385,187

(22) Filed: Feb. 6, 2012

(65) Prior Publication Data

US 2012/0141196 A1 Jun. 7, 2012

Related U.S. Application Data

(63) Continuation-in-part of application No. 12/290,812, filed on Nov. 4, 2008, now abandoned.

(51) Int. Cl.
*B25G 3/18* (2006.01)
(52) U.S. Cl. .................................... 403/322.4
(58) Field of Classification Search ............... 403/110, 403/234, 235, 237, 290, 321, 322.1, 322.4; 16/110.1, 111.1, 426, DIG. 24, DIG. 25
See application file for complete search history.

(56) References Cited

U.S. PATENT DOCUMENTS

| | | | |
|---|---|---|---|
| 5,319,992 A * | 6/1994 | Shui-Te | 74/543 |
| 5,526,661 A | 6/1996 | Lin | |
| 5,556,222 A | 9/1996 | Chen | |
| 5,560,272 A | 10/1996 | Bolger | |
| 6,948,878 B1 | 9/2005 | Smith, Jr. et al. | |
| 7,866,193 B2 * | 1/2011 | Tribout | 70/233 |

* cited by examiner

*Primary Examiner* — Michael P Ferguson
*Assistant Examiner* — Daniel Wiley
(74) *Attorney, Agent, or Firm* — Charles E. Baxley

(57) ABSTRACT

A quick release device includes an attaching member having a chamber for receiving various objects and having two end members, and having an aperture formed through the end members for receiving a tie rod, a longitudinal lever arm having a bore for reducing the weight of the lever arm, and having a cam member for engaging with one of the end members, and having a channel formed in the cam member for forming two limbs, and having an orifice formed in the limbs for receiving a shaft, and the free end portion of the tie rod is secured to the shaft for securing or releasing the end members, the lever arm includes an increasing strength and a decreased weight and a decreased manufacturing cost.

3 Claims, 3 Drawing Sheets

QUICK RELEASE DEVICE FOR BICYCLE

The present invention is a continuation-in-part of U.S. patent application Ser. No. 12/290,812, filed 4 Nov. 2008, pending and to be abandoned.

BACKGROUND OF THE INVENTION

1. Field of the Invention

The present invention relates to a quick release device, and more particularly to a quick release device including a hollow lever arm for increasing the strength of the quick release device and for decreasing the weight of the quick release device and for decreasing the manufacturing cost for the quick release device.

2. Description of the Prior Art

Various kinds of typical quick locking or quick release mechanisms have been developed and comprise two movable ear members, a tie rod slidably engaged between the ear members, and a handle or lever arm having a cam member coupled to the tie rod for easily and quickly clamping or locking or securing the ear members together, and/or easily and quickly releasing the ear members from each other.

For example, U.S. Pat. No. 5,526,661 to Lin, U.S. Pat. No. 5,556,222 to Chen, U.S. Pat. No. 5,560,272 to Bolger, and U.S. Pat. No. 6,948,878 to Smith, Jr. et al. disclose several of the typical quick locking or quick release mechanisms each comprising a pivotal or rotatable handle or lever arm coupled to a tie rod of a clamping member for easily and quickly moving the ear members of the clamping member toward or away from each other and for clipping or clamping the clamping member onto various support facilities.

However, normally, the handles or lever arms are made of metal materials and are made of a rod-shaped and/or planar and solid structure such that the handles or lever arms may include a greatly increased weight and a greatly increased manufacturing cost, and may include a relatively decreased bending strength.

The present invention has arisen to mitigate and/or obviate the afore-described disadvantages of the conventional handles or lever arms for the quick release devices.

SUMMARY OF THE INVENTION

The primary objective of the present invention is to provide a quick release device including a hollow lever arm for increasing the strength of the quick release device and for decreasing the weight of the quick release device and for decreasing the manufacturing cost for the quick release device.

In accordance with one aspect of the invention, there is provided a quick release device comprising an attaching member including a chamber formed therein, and including a first end member and a second end member located close to each other for forming a slot between the first and the second end members, and including an aperture formed through the first and the second end members and communicative with the slot of the attaching member, a tie rod received and engaged in the aperture of the first and the second end members, and including an end portion engaged with the first end member, and including a free end portion, a lever arm including a longitudinal structure having a first end and a second end, and including a longitudinal bore formed through the lever arm, and including a cam member formed on the second end of the lever arm for engaging with the second end member, and including a channel formed in the cam member and communicative with the longitudinal bore of the cam member for forming two limbs in the cam member and for slidably receiving the free end portion of the tie rod, and including an orifice formed in the limbs of the cam member and communicative with the channel of the cam member, the bore of the lever arm being a blind bore having an enclosed first end at the first end of the lever arm and having an open second end at the second end of the lever arm communicative with the channel and the orifice of the cam member, and the bore of the lever arm including a uniform and identical inner diameter through a length thereof and between the enclosed first end and the open second end of the bore of the lever arm, and the lever arm including a circular-shaped cross section having a cylindrical shape, and the first end of the lever arm including a smaller outer diameter than that of the second end of the lever arm and uniformly tilted and inclined from the first end of the lever arm toward the second end of the lever arm, the lever arm including a hand grip provided on the first end of the lever arm, a cam seat attached onto the free end portion of the tie rod and contacted and engaged with the second end member, and the cam seat including a curved recess formed therein for engaging with the cam member, and a shaft rotatably received in the orifice of the limbs of the lever arm and extended and engaged through the channel of the cam member, and the free end portion of the tie rod being engaged and secured to the shaft for allowing the cam member to selectively secure the first and the second end members together and to selectively release the first and the second end members from each other when the lever arm is moved relative to the attaching member.

The lever arm includes one or more flat surfaces formed on an outer peripheral portion thereof. The cam member is preferably a spherical cam member. The hand grip is preferably a spherical hand grip.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
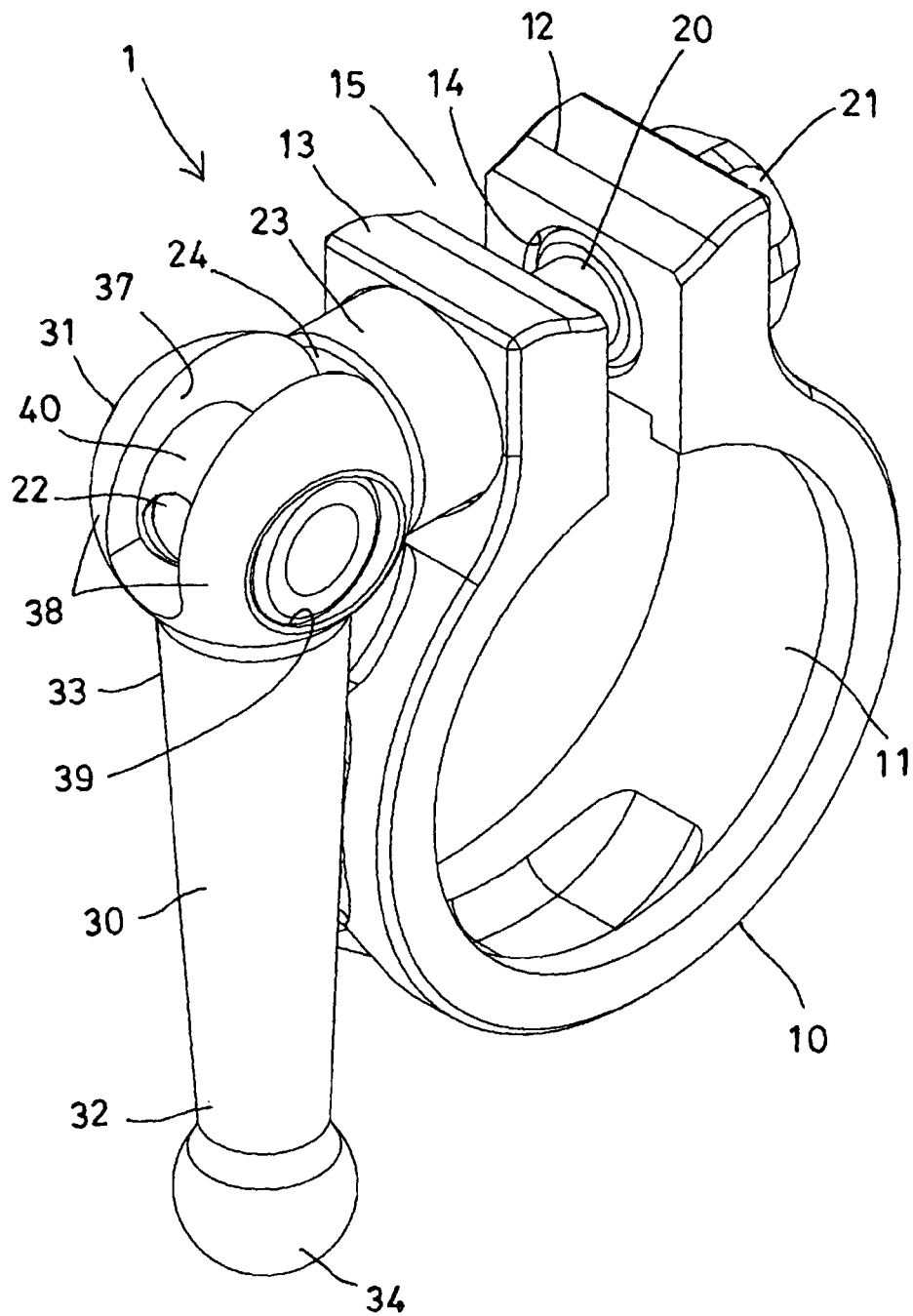
FIG. 1 is a perspective view illustrating a portion of a quick release device in accordance with the present invention.

Referring to the drawings, and initially to FIG. 1, a quick release device 1 in accordance with the present invention comprises an attaching member 10 including a substantially C-shaped structure having a chamber 11 formed therein for receiving various objects (not shown), such as the handlebars of the bicycles, the seat posts of the bicycles, the wheel devices or the wheel hubs of the bicycles, etc., and for easily and quickly attaching and securing the handlebars, the seat or saddle posts, the wheel devices, the wheel hubs or other objects onto the bicycle.

The C-shaped attaching member 10 includes two end portions or end members 12, 13, such as a first end member 12 and a second end member 13, located close to each other and positioned one above the other for forming a slot 15 between the end members 12, 13, and includes an aperture 14 laterally formed through both of the end members 12, 13 thereof and intersecting or communicative with the slot 15 that is formed between the end members 12, 13 of the attaching member 10 for receiving a pole or tie rod 20 therein. The tie rod 20 is thus engaged through the aperture 14 of the end members 12, 13 and includes an enlarged head 21 formed or provided on one end portion thereof for engaging with the first end member 12.

The tie rod 20 includes an outer or free end portion 22 extended out of the second end member 13, and a wear-resist pad or gasket or cam seat 23 attached onto the outer or the free end portion 22 of the tie rod 20 and contacted or engaged with the second end member 13, in which the cam seat 23 includes a curved recess 24 formed therein and located or facing away from the second end member 13. The quick release device 1 further includes a handle or lever arm 30 having a rounded or substantially spherical cam member 31 formed or provided on one of the two ends 32, 33 thereof for attaching onto the free end portion 22 of the tie rod 20 and for engaging with the curved recess 24 of the cam seat 23.

Figure 2:
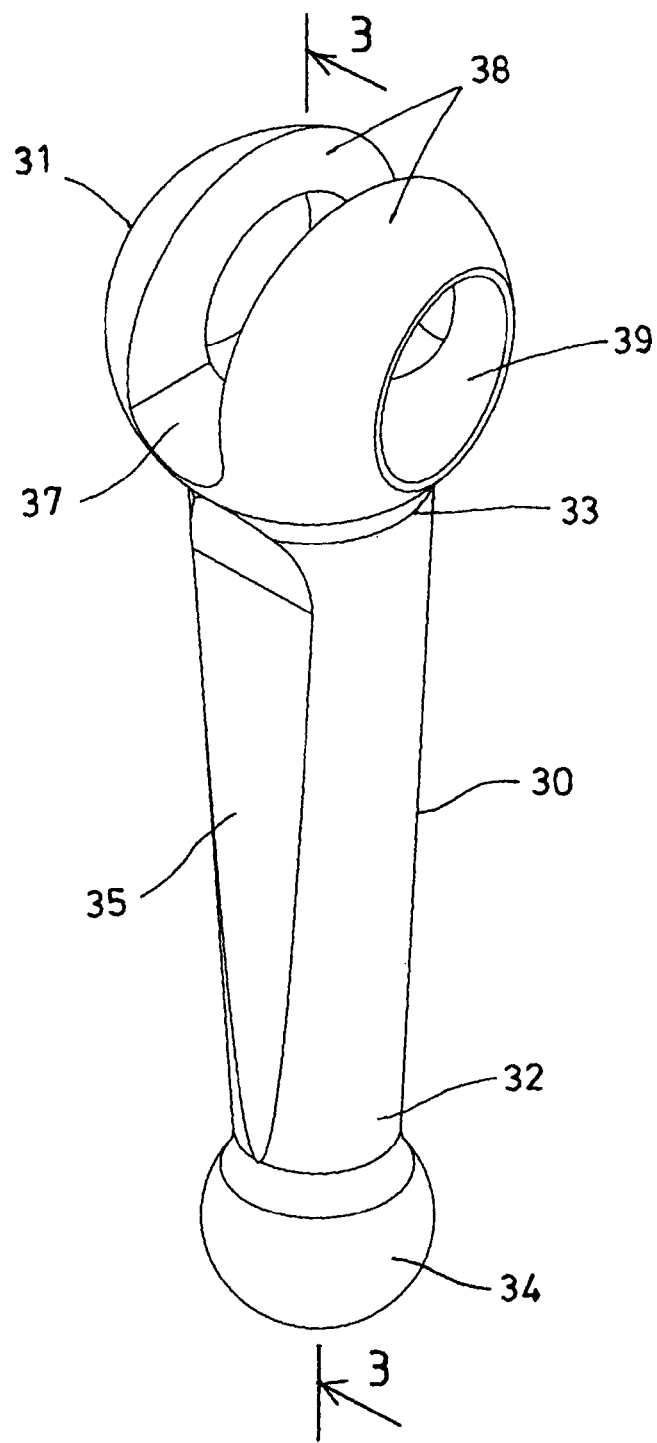
FIG. 2 is a perspective view of a lever arm of the quick release device.
Figure 3:
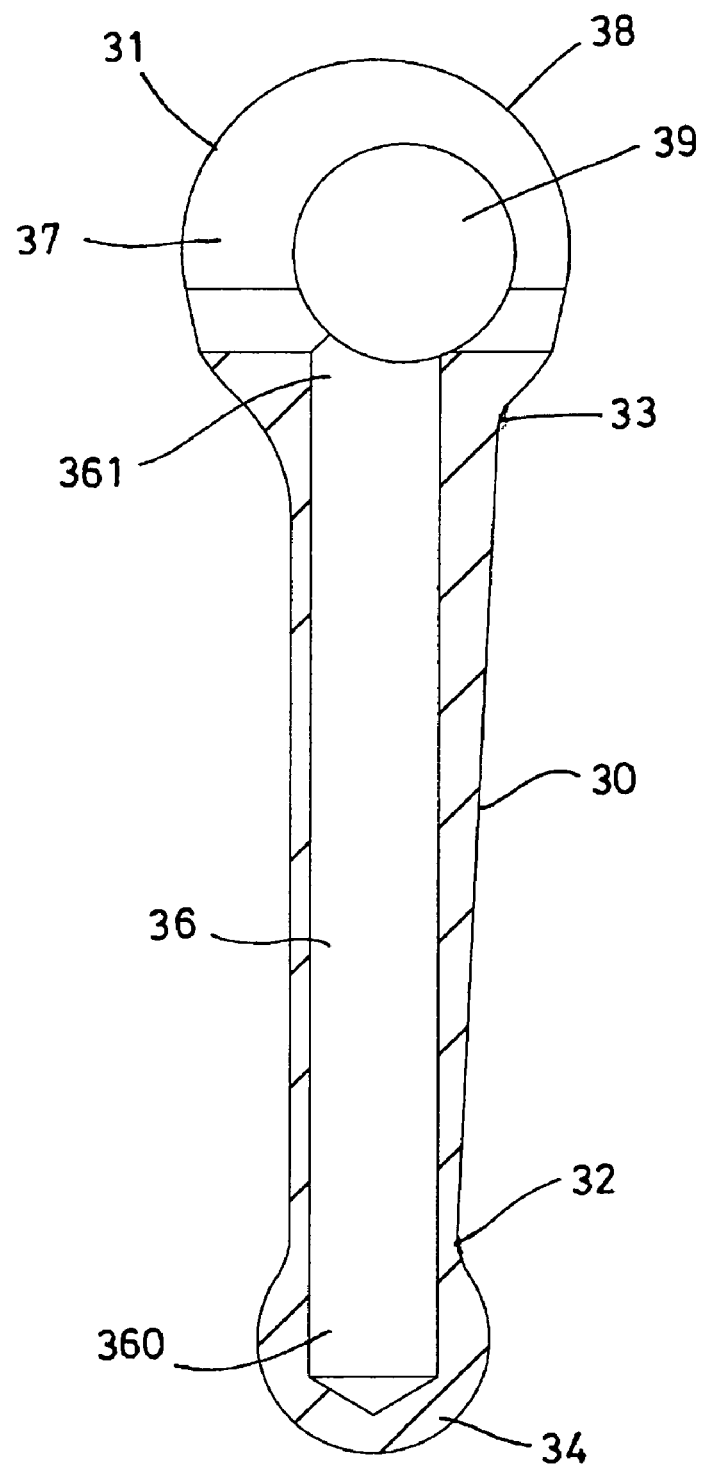
FIG. 3 is a cross sectional view of the lever arm of the quick release device taken along lines 3-3 of FIG. 2.

As shown in FIGS. 1-3, the lever arm 30 includes a longitudinal structure having a substantially circular-shaped cross section, or having a substantially cylindrical shape, and includes one end or first end 32 having a smaller outer diameter than the other end or second end 33, and uniformly tilted and inclined from the one end or first end 32 thereof toward the other end or second end 33 thereof, and includes a rounded or substantially spherical knob or hand grip 34 formed or provided on the first end 32 thereof for being comfortably held by the user, and includes one or more cut off portions or flat surfaces 35 (FIG. 2) formed on the outer peripheral portion thereof, and includes a longitudinal and blind bore 36 (FIG. 3) formed through the longitudinal lever arm 30, and includes the cam member 31 formed or provided on the other end or second end 33 thereof.

The lever arm 30 includes a channel 37 formed in the cam member 31 and intersecting or communicative with the bore 36 of the lever arm 30 for forming two limbs 38 and for slidably receiving the free end portion 22 of the tie rod 20, and includes an orifice 39 laterally formed in the cam member 31 and intersecting or communicative with the channel 37 of the cam member 31 or of the lever arm 30 for rotatably receiving a shaft 40 therein (FIG. 1), the shaft 40 is arranged substantially perpendicular to the lever arm 30 and engaged through the orifice 39 of the limbs 38 of the cam member 31 and also extended or engaged through the channel 37 of the cam member 31. The free end portion 22 of the tie rod 20 may be engaged or secured to the shaft 40 with latches or fasteners (not shown), force-fitted engagements, threading engagements or the like.

The bore 36 of the lever arm 30 is a blind bore 36 having an enclosed end 360, such as an enclosed first end 360 at the first end 32 of the lever arm 30 and having an open end 361, such as an open second end 361 at the second end 33 of the lever arm 30 and communicative with the channel 37 and the orifice 39 of the cam member 31, and the bore 36 of the lever arm 30 includes a uniform and identical inner diameter through the length thereof and between the ends 360, 361 of the bore 36 of the lever arm 30 for suitably increasing the stiffness and the bending strength of the lever arm 30, or for allowing the stiffness and the bending strength of the lever arm 30 to be suitably increased.

It is to be noted that the lever arm 30 includes a longitudinal structure having a substantially circular-shaped cross section, or having a substantially cylindrical shape, and having a longitudinal bore 36 (FIG. 3) formed through the longitudinal lever arm 30, and having one end or first end 32 having a smaller outer diameter than the other end or second end 33 for allowing the stiffness and the bending strength of the lever arm 30 to be suitably increased, and for allowing the weight of the lever arm 30 to be suitably decreased, and thus for allowing the attaching member 10 to be easily and quickly and effectively attached or secured onto the various objects or disengaged from the various objects.

In operation, as shown in FIG. 1, the lever arm 30 may be pulled or moved toward or away from or relative to the attaching member 10 to actuate the cam member 31 to engage with and/or to act onto the cam seat 23 and the second end member 13 of the attaching member 10 for allowing the end members 12, 13 to be selectively and solidly secured together and thus to solidly secure onto the object, or for allowing the end members 12, 13 to be released or separated from each other and for allowing the end members 12, 13 to be easily and quickly attached onto and disengaged from the object when required.

Accordingly, the quick release device in accordance with the present invention includes a hollow lever arm for increasing the strength of the quick release device and for decreasing the weight of the quick release device and for decreasing the manufacturing cost for the quick release device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A quick release device comprising:

an attaching member including a chamber formed therein, and including a first end member and a second end member located close to each other for forming a slot between said first and said second end members, and including an aperture formed through said first and said second end members and communicative with said slot of said attaching member, a tie rod received and engaged in said aperture of said first and said second end members, and including an end portion engaged with said first end member, and including a free end portion, a lever arm including a longitudinal structure having a first end and a second end, and including a longitudinal bore formed through said lever arm, and including a cam member formed on said second end of said lever arm for engaging with said second end member, and including a channel formed in said cam member and communicating with said longitudinal bore of said lever arm, said channel located between two limbs of said cam member for slidably receiving said free end portion of said tie rod, and including a transverse through hole formed in each of said limbs of said cam member and communicating with said channel of said cam member, said bore of said lever arm being a blind bore having an enclosed first end at said first end of said lever arm and having an open second end at said second end of said lever arm communicating with said channel, and said bore of said lever arm including a uniform inner diameter between said enclosed first end and said open second end of said bore of said lever arm, and said lever arm including a circular-shaped cross section having a cylindrical shape, and said first end of said lever arm including a smaller outer diameter than that of said second end of said lever arm and uniformly tilted and inclined from said first end of said lever arm toward said second end of said lever arm, said lever arm including a spherical hand grip provided on said first end of said lever arm, wherein said enclosed first end of said longitudinal bore is disposed within said hand grip, a cam seat attached onto said free end portion of said tie rod and contacted and engaged with said second end member, and said cam seat including a curved recess formed therein for engaging with said cam member, and a shaft rotatably received in said transverse through holes of said limbs of said lever arm and extended and engaged through said channel of said cam member, and said free end portion of said tie rod being engaged and secured to said shaft for allowing said cam member to selectively secure said first and said second end members together and to selectively release said first and said second end members from each other when said lever arm is moved relative to said attaching member.

2. The quick release device as claimed in claim 1, wherein said lever arm includes at least one flat surface formed on an outer peripheral portion thereof.

3. The quick release device as claimed in claim 1, wherein said cam member is a spherical cam member.

* * * * *